(12) United States Patent
Trueb

(10) Patent No.: US 8,136,548 B2
(45) Date of Patent: Mar. 20, 2012

(54) AIR ADMITTANCE VALVE

(75) Inventor: Thomas W. Trueb, Ellington, CT (US)

(73) Assignee: Watertite Products, Inc., Gardena, CA (US)

( * ) Notice: Subject to any disclaimer, the term of this patent is extended or adjusted under 35 U.S.C. 154(b) by 881 days.

(21) Appl. No.: 12/188,680

(22) Filed: Aug. 8, 2008

(65) Prior Publication Data
US 2010/0032028 A1 Feb. 11, 2010

(51) Int. Cl.
F16K 15/00 (2006.01)

(52) U.S. Cl. ............... 137/526; 137/533.29; 137/533.31

(58) Field of Classification Search .................. 137/526, 137/215, 216, 216.2, 217, 246, 143, 114, 137/533.21, 533.29, 543.15, 843, 533.31
See application file for complete search history.

(56) References Cited

U.S. PATENT DOCUMENTS

| | | | |
|---|---|---|---|
| 35,535 A | 6/1862 | Merrill et al. | |
| 1,739,430 A * | 12/1929 | Webster | 137/533.21 |
| 2,520,771 A | 8/1950 | Martin et al. | |
| 2,704,996 A * | 3/1955 | Peterson et al. | 91/26 |
| 2,928,413 A | 3/1960 | Hansen | |
| 3,073,339 A * | 1/1963 | Stelzer | 137/516.15 |
| 3,923,081 A | 12/1975 | Persson | |
| 4,232,706 A | 11/1980 | Ericson | |
| 4,436,107 A | 3/1984 | Persson | |
| 4,493,339 A | 1/1985 | Porter, Jr. | |
| 4,535,807 A | 8/1985 | Ericson | |
| 4,545,398 A | 10/1985 | van Olst | |
| 4,556,084 A | 12/1985 | Frawley | |
| 4,867,802 A | 9/1989 | Earl | |
| 4,991,623 A * | 2/1991 | Ericson | 137/526 |
| 5,048,562 A | 9/1991 | Frawley | |
| 5,273,068 A | 12/1993 | Duren | |
| 5,419,366 A | 5/1995 | Johnston | |
| 5,441,679 A | 8/1995 | Chalich | |
| RE35,532 E * | 6/1997 | Duren | 137/526 |
| 5,706,854 A | 1/1998 | Haynes | |
| 5,881,759 A | 3/1999 | Andersson | |
| 5,913,330 A * | 6/1999 | Jones et al. | 137/493.8 |
| 5,971,014 A | 10/1999 | Duren | |
| 5,983,929 A | 11/1999 | Andersson | |
| 6,234,198 B1 | 5/2001 | Chalich | |
| 6,308,731 B1 | 10/2001 | Kawasaki | |

(Continued)

FOREIGN PATENT DOCUMENTS

EP 0 409 506 A1 1/1991

Primary Examiner — Craig Schneider
Assistant Examiner — Jessica Cahill
(74) Attorney, Agent, or Firm — Alston & Bird LLP

(57) ABSTRACT

An air admittance valve configured when subjected to a negative pressure condition to vent a pipe system to an ambient environment. In general, the air admittance valve includes a main body, inner and outer valve seats, a flexible sealing element, and a lid. The inner and outer valve seats define at least one vent opening between valve seats that is configured, when open, to communicate with the ambient environment. The flexible sealing element is devoid of a rigidifying structure, is configured to move to and from a closed position and an open position, and defines an outer perimeter surface, an inner perimeter surface, and opposite top and bottom surfaces extending between the outer and inner perimeter surfaces. At least one of the lid or the main body further comprises one or more guiding elements that define one or more guiding surfaces configured to guide the sealing element to and from the closed position and the open position.

19 Claims, 8 Drawing Sheets

U.S. PATENT DOCUMENTS

| | | |
|---|---|---|
| 6,415,816 B1 | 7/2002 | Beckey et al. |
| 6,532,988 B1 | 3/2003 | Ericson |
| 6,557,825 B2 | 5/2003 | Stone et al. |
| 7,270,146 B1 | 9/2007 | Johnston et al. |
| 2006/0191576 A1 | 8/2006 | McCoy |
| 2006/0237678 A1 | 10/2006 | Lackey |

* cited by examiner

AIR ADMITTANCE VALVE

FIELD OF THE INVENTION

The present invention relates to air ventilation devices for use in pipe systems, and, more particularly, to air admittance valves used to vent pipe systems to the ambient environment.

BACKGROUND OF THE INVENTION

In general, air admittance valves are used in plumbing systems as an alternative to vent systems that require venting through a complicated pipe system and/or rooftop vent system. Air admittance valves are one-way mechanical valves that may be located in a ventilated space to alleviate a need to connect to a central vertical vent (or to provide a separate vertical vent) that passes through the roof of a structure. FIG. 1 shows a typical application of an air admittance valve. Air admittance valves are normally closed, but open during a negative pressure condition, such as when wastewater is released. This allows air to enter the plumbing system and facilitate drainage. Once the flow of the wastewater ceases, the valve closes and remains closed until another negative pressure condition occurs. In such a manner, odors are prevented from escaping from the vent system.

Many air admittance valves rely on gravity to close the valve once a negative pressure condition ceases. Such air admittance valves usually include sealing members that are constructed of multiple components. Typically, a rigid plate or frame structure is used to carry a thin flexible sealing member to and from closed and open positions. In many instances the thin flexible sealing member is bonded, stretched across, or otherwise fixed to the rigid frame structure. An example of such a design is described in U.S. Pat. No. 4,535,807.

These multipart constructions, however, are difficult and expensive to manufacture. Additionally, any detachment of the sealing member from the rigid frame structure is likely to result in inferior, and in some situations, failed performance of the air admittance valve. Furthermore, in many situations the ability of the sealing member to perform the sealing function is dictated by the accuracy of the dimensions of the frame structure. For instance, frame structures that have certain discontinuities, uneven surfaces, or other dimensional aberrations may not allow the sealing members to seal the valve in the closed position.

There is a need, therefore, for an improved air admittance valve that is configured to vent pipe systems to the ambient environment. The improved air admittance valve should be simpler and less expensive to manufacture, and should also provide enhanced performance.

BRIEF SUMMARY OF THE INVENTION

The present invention addresses the above needs and achieves other advantages by providing an air admittance valve configured when subjected to a negative pressure condition to vent a pipe system to an ambient environment. In general, the air admittance valve includes a main body, inner and outer valves seats, a flexible sealing element, and a lid. In one embodiment, the main body has top and bottom portions, is configured to sealingly attach to the pipe system proximate the bottom portion, and further defines a first chamber configured to communicate with the vent pipe system. The inner and outer valve seats define a vent opening that is configured to vent to the ambient environment. The flexible sealing element is devoid of a rigidifying structure, is configured to move between a closed position and an open position, and defines an outer perimeter surface, an inner perimeter surface, and opposite top and bottom surfaces extending between the outer and inner perimeter surfaces. The lid is configured to sealingly attach to the main body proximate the top portion of the main body. At least one of the lid and main body further comprises one or more guiding elements that define one or more guiding surfaces configured to guide the sealing element to and from the closed position and the open position. In the closed position, the bottom surface of the sealing element rests against the inner and outer valve seats, thus blocking the vent opening that is vented to the ambient environment. In the open position, the sealing element rises off of the inner and outer valve seats such that the first chamber communicates with the ambient environment through the vent opening. In some embodiments, the top surface of the sealing element may include an inner support rib and an outer support rib, wherein the inner and outer support ribs are configured to provide support for the sealing element proximate the inner and outer valve seats, respectively. In other embodiments, the sealing member may further comprise a middle rib disposed between the inner and outer ribs.

In some embodiments, the lid may further comprise a top portion, and a side portion extending approximately perpendicularly from an outer perimeter of the top portion of the lid, the top and side portions of the lid each defining inner and outer surfaces such that the inner surfaces of the lid define a second chamber. In some embodiments, the main body may further comprise an approximately cylindrically-shaped main body wall defining an inner surface and an outer surface, the main body further defining an internal communication element that extends inwardly from the inner surface of the main body wall, and wherein the internal communication element comprises a plurality of openings allowing communication therethrough between the first chamber and the second chamber. In some embodiments, the one or more guiding elements may comprise a plurality of guiding elements that extend from the inner surface of the top portion of the lid. In other embodiments, the plurality of guiding elements may comprise a plurality of triangularly-shaped ribs extending substantially downward from the inner surface of the top portion of the lid, the plurality of ribs defining a plurality of guiding edges and wherein the ribs are disposed radially about an imaginary center point.

In some embodiments, the main body may further comprise an approximately cylindrically-shaped main body wall defining an inner surface and an outer surface, wherein one end of the main body wall defines the inner valve seat, and wherein the main body further defines an external communication element that extends outwardly and at an angle from the outer surface of the main body wall such that an end of the external communication element defines the outer valve seat, wherein a third chamber is defined between the outer surface of the main body wall and the external communication element, and wherein the external communication element comprises a plurality of openings allowing communication therethrough between the third chamber and the ambient environment. In some embodiments, a plurality of support walls may be disposed within the third chamber. In other embodiments, the one or more guiding elements may comprise a plurality of guiding elements that extend from the internal communication element of the main body. In other embodiments, the plurality of guiding elements may comprise a plurality of triangularly-shaped ribs extending from the internal communication element of the main body, and wherein the ribs may be disposed radially about an imaginary center point.

In another embodiment, the air admittance valve comprises a main body made of a rigid material, a flexible ring-shaped sealing member, and a lid made of a rigid material. The main body has top and bottom portions and is configured to sealingly attach to the pipe system proximate the bottom portion and a main body chamber configured to communicate with the pipe system. The main body also comprises an approximately cylindrically-shaped main body wall defining an inner surface and an outer surface, wherein one end of the main body wall defines an inner valve seat, and wherein the main body further defines an internal communication element and an external communication element, the internal communication element extending inwardly from the inner surface of the main body wall and comprising a plurality of openings allowing communication therethrough between the main body chamber and a lid chamber, the external communication element extending outwardly and at an angle from the outer surface of the main body wall such that an end of the external communication element defines an outer valve seat. An external communication chamber is defined between the outer surface of the main body wall and the external communication element, and the external communication element comprises a plurality of openings allowing communication therethrough between the external communication chamber and the ambient environment. A vent opening is defined between the inner and outer valves seats that is configured to provide communication between the external communication chamber and the lid chamber. The flexible ring-shaped sealing element is configured to move between a closed position and an open position, and the sealing element defines an outer perimeter surface, an inner perimeter surface, and opposite top and bottom surfaces extending between the outer and inner perimeter surfaces. The lid is made of a rigid material and is configured to sealingly attach to the main body proximate the top portion of the main body, the lid comprising a top portion, and a side portion extending approximately perpendicularly from an outer perimeter of the top portion, the top and side portions each defining inner and outer surfaces such that the inner surfaces define the lid chamber. The lid further comprises a plurality of triangularly-shaped ribs extending downward from the inner surface of the top portion of the lid and disposed radially about an imaginary center point such that the plurality of ribs define a plurality of guiding edges configured to guide the sealing element via the inner perimeter surface of the sealing element to and from the closed position, in which the bottom surface of the sealing element rests against the inner and outer valve seats of the main body thus blocking communication through the vent opening, and the open position, in which the sealing element rises off of the inner and outer valve seats such that the main body chamber communicates with the ambient environment through the vent opening, the lid chamber, and the external communication chamber.

BRIEF DESCRIPTION OF THE DRAWINGS

Figure 1:
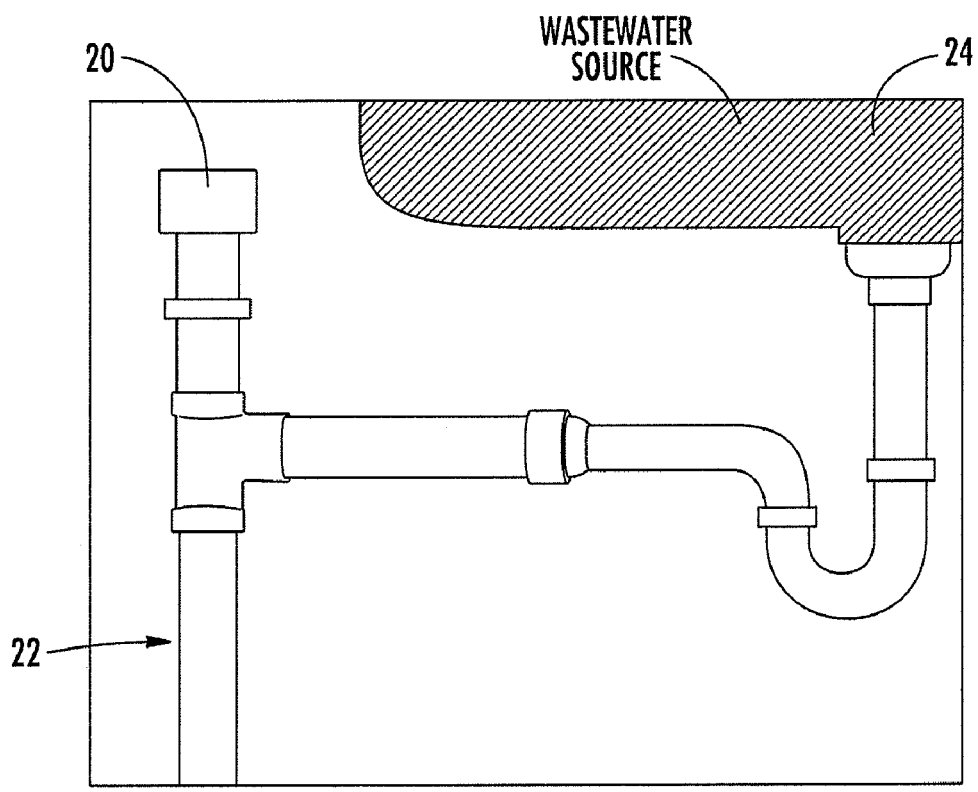
Figure 2:
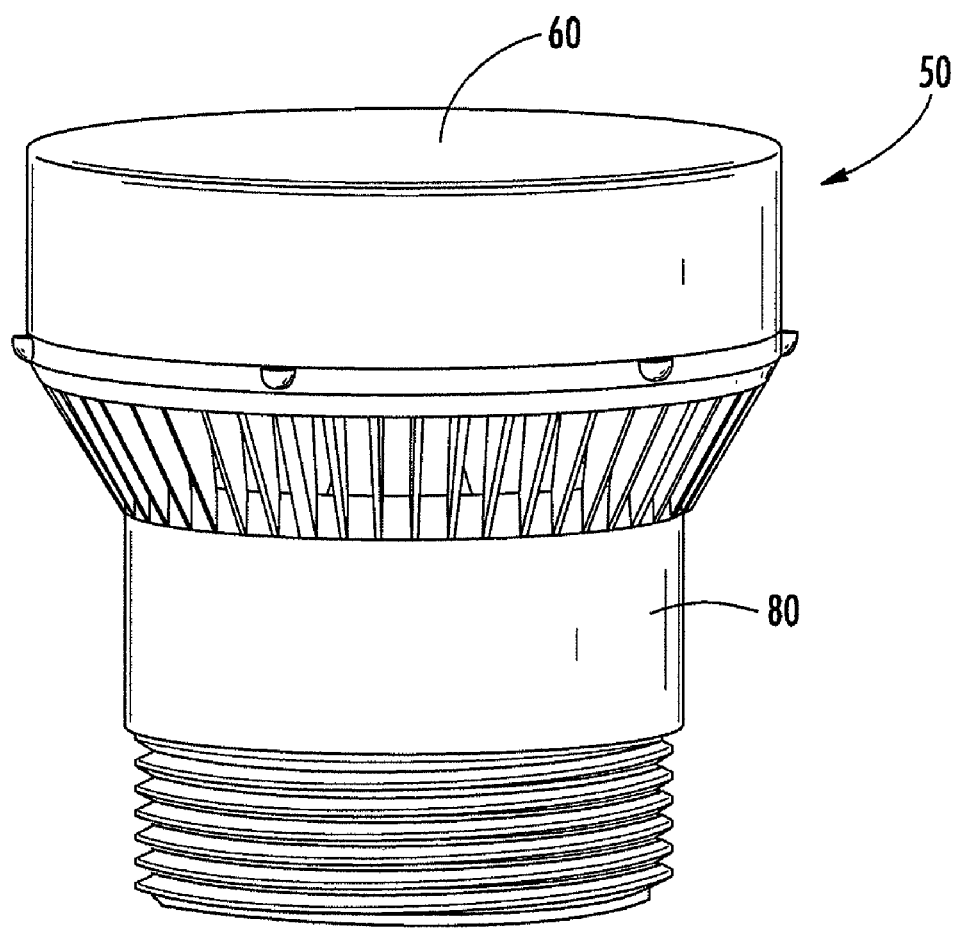
Figure 3:
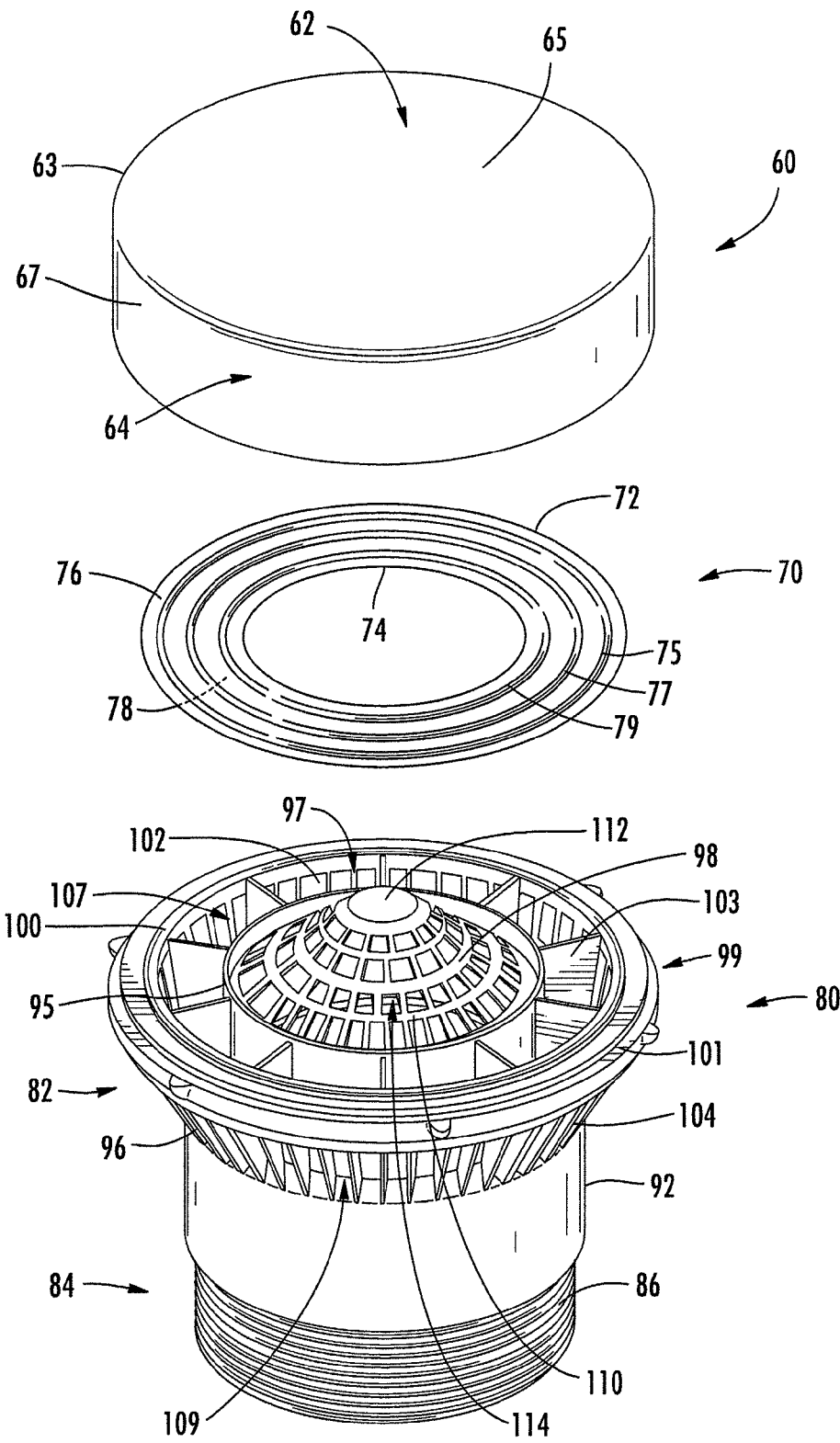
Figure 4:
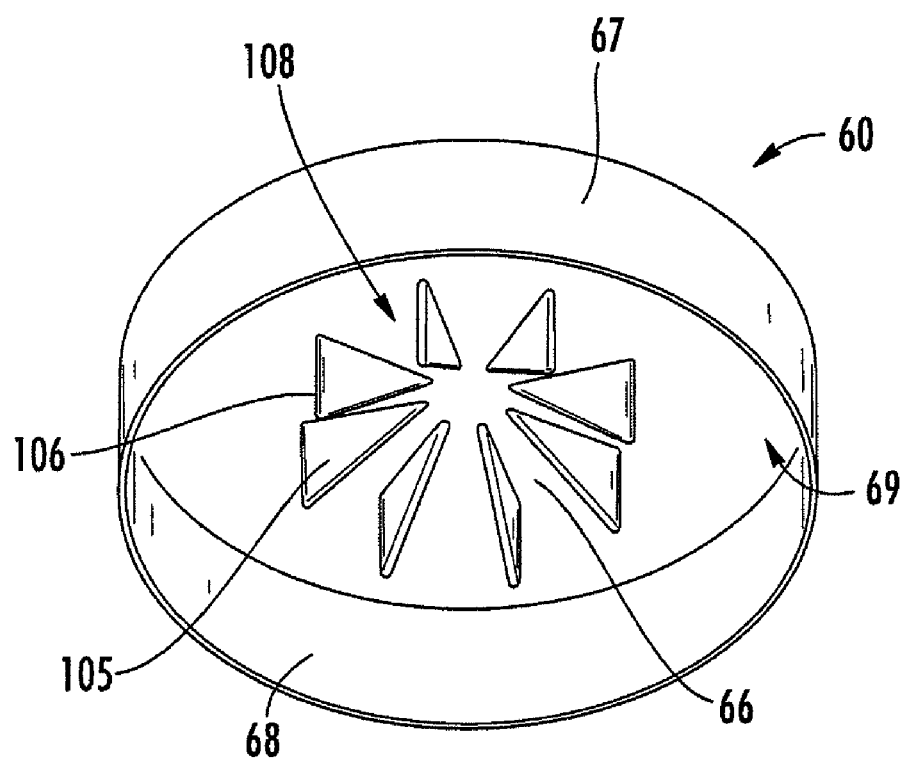
Figure 5:
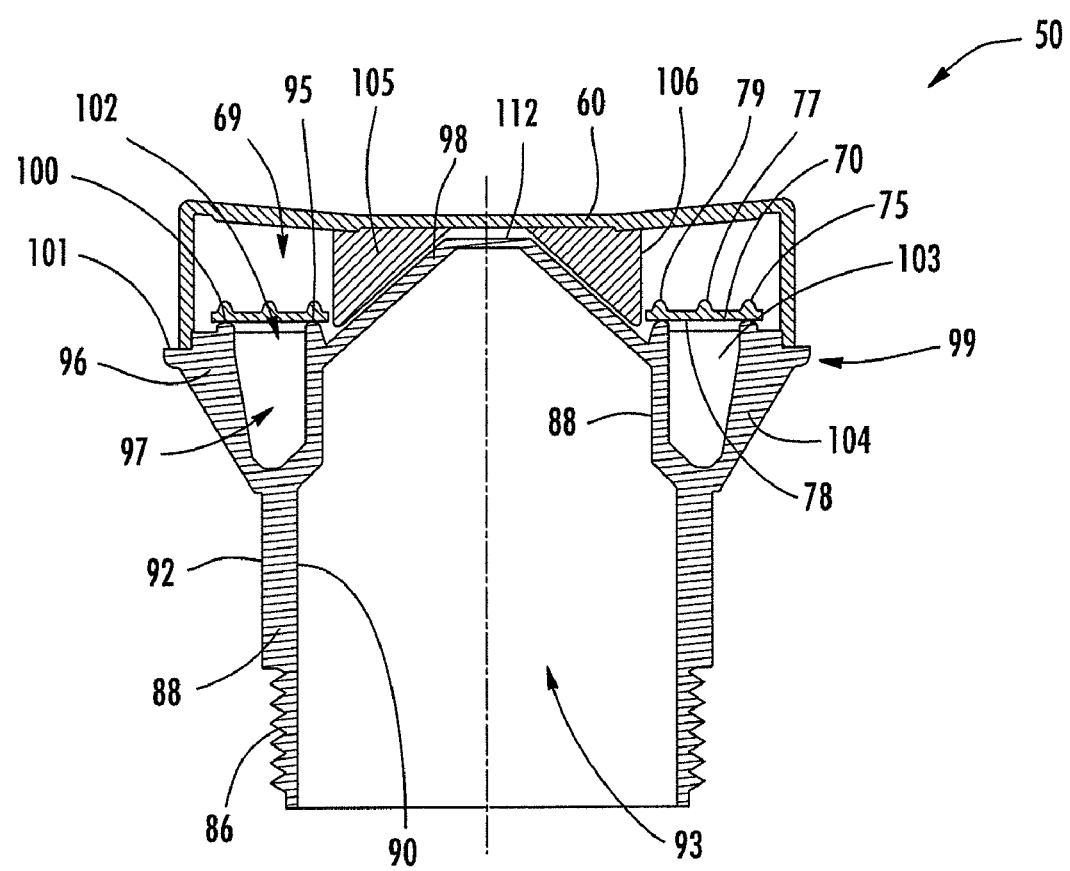
Figure 6:
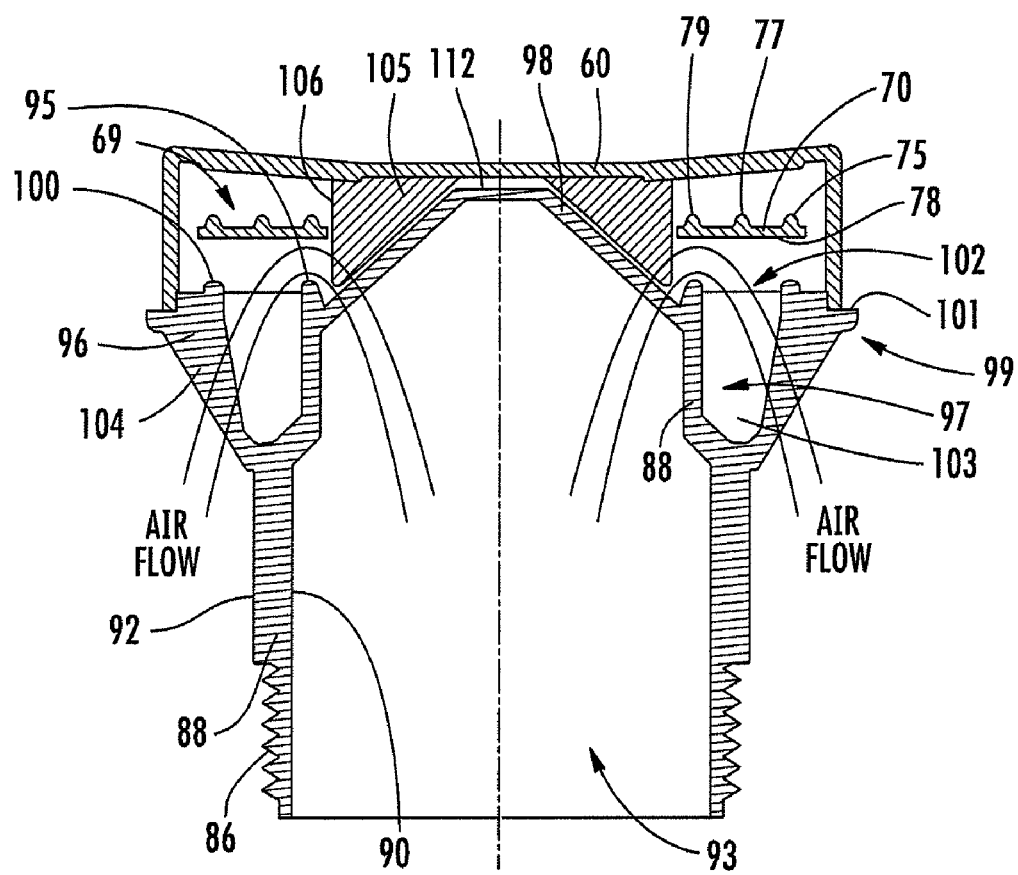
Figure 7:
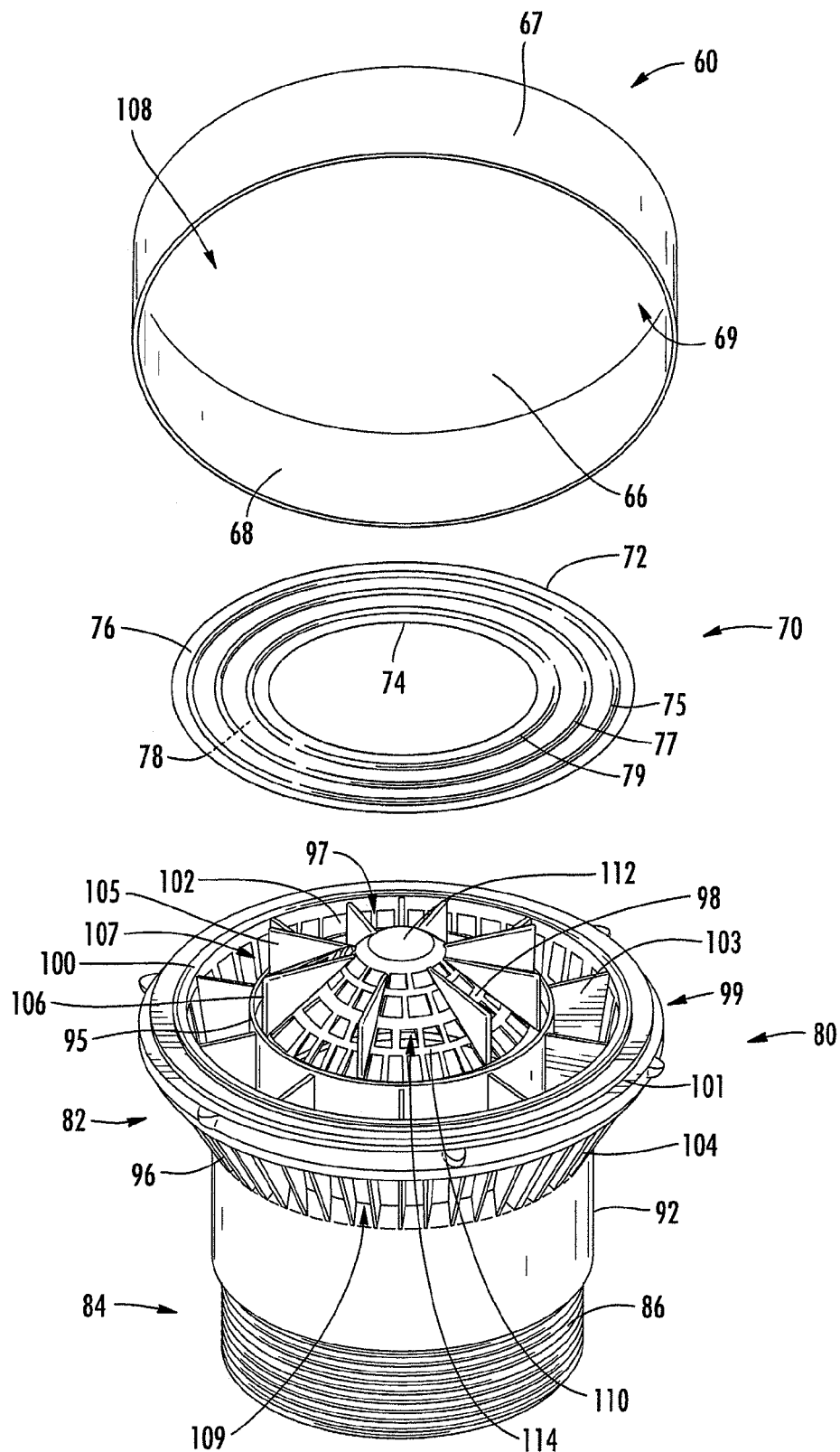
Figure 8:
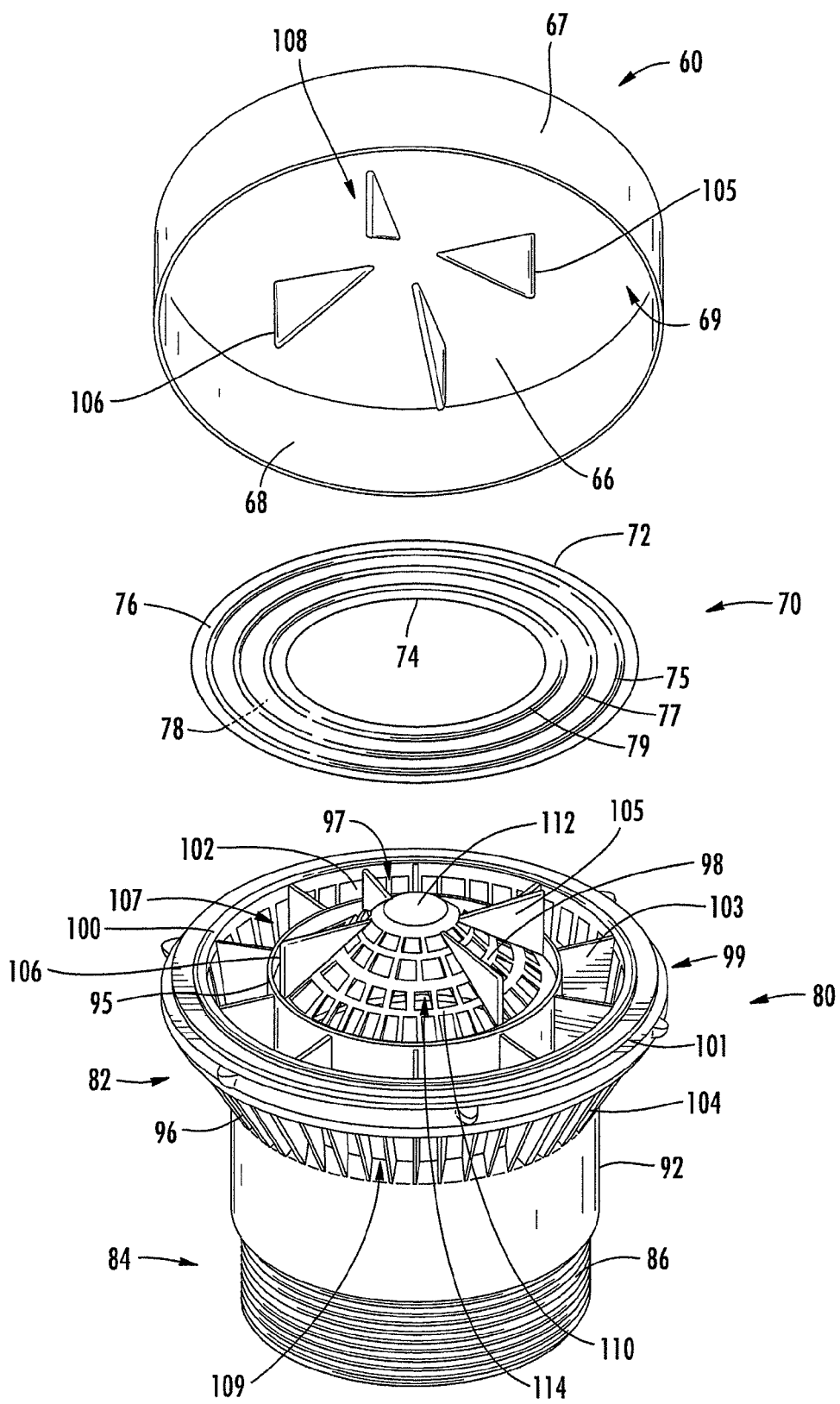

Having thus described the invention in general terms, reference will now be made to the accompanying drawings, which are not necessarily drawn to scale, and wherein:

FIG. 1 shows a common application of an air admittance valve in accordance with the prior art;

FIG. 2 is a perspective view of an assembled air admittance valve in accordance with an exemplary embodiment of the present invention;

FIG. 3 is an exploded perspective view showing a lid, a sealing member, and a main body of an air admittance valve in accordance with an exemplary embodiment of the present invention;

FIG. 4 is a perspective view of the underside of a lid of an air admittance valve in accordance with an exemplary embodiment of the present invention;

FIG. 5 is a cross-section view of an assembled air admittance valve in a closed position in accordance with an exemplary embodiment of the present invention;

FIG. 6 is a cross-section view of an assembled air admittance valve in an open position in accordance with an exemplary embodiment of the present invention;

FIG. 7 is an exploded perspective view showing a sealing member, a main body, and the underside of a lid of an air admittance valve in accordance with another exemplary embodiment of the present invention; and FIG. 8 is an exploded perspective view showing a sealing member, a main body, and the underside of a lid of the air admittance valve in accordance with yet another exemplary embodiment of the present invention.

DETAILED DESCRIPTION OF THE INVENTION

The present invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

FIG. 1 shows a common application of an air admittance valve in accordance with the prior art. As depicted in the figure, in a common application an air admittance valve 20 communicates with a plumbing system 22 to vent the plumbing system upon the discharge of wastewater, such as from a wastewater source 24. Although the air admittance valve 20 opens upon discharge of the wastewater, it is normally closed to prevent the escape of gases from the plumbing system. As noted above, many prior art air admittance valves include a rigid plate or frame structure that is used to carry a thin flexible sealing member to and from closed and open positions. However, these multipart constructions are not only difficult and expensive to manufacture, but sometimes result in poor performance due to inconsistencies in the frame structures.

FIG. 2 shows a perspective view of an assembled air admittance valve 50 in accordance with an exemplary embodiment of the present invention, and FIG. 3 shows an exploded perspective view of the air admittance valve 50 in accordance with an exemplary embodiment of the present invention. In general, the air admittance valve 50 according to various embodiments of the present invention includes a lid 60, a flexible sealing element 70 (not visible in FIG. 2), and a main body 80. Referring to FIG. 3, in the depicted embodiment, the lid 60 is made of a rigid thermoplastic material, such as, for example, polyvinyl chloride (PVC) or acrylonitrile butadiene styrene (ABS), and comprises a top portion 62 having an outer perimeter 63, and a side portion 64 that extends approximately perpendicularly from the outer perimeter 63 of the top portion 62. The top portion 62 includes an outer surface 65 and an inner surface 66 (inner surface 66 is visible in FIG. 4). Likewise, the side portion 64 includes an outer surface 67 and an inner surface 68 (inner surface 68 is visible in FIG. 4). It should be noted that in other embodiments, the lid may be constructed of any rigid material. Additionally, other configurations of the lid are possible, including, for example, disk-like configurations that do not include side portions. In the depicted embodiment, a lid chamber 69 is defined by the inner surfaces 66, 68 of the lid 60 (lid chamber 69 is visible in FIG. 4). As shown in the figure, the lid 60 has a substantially circular top profile, which is designed to sealingly attach to the main body 80. It should be noted that in other embodiments the lid 60 and/or the main body 80 may have various other configurations and are not limited to the shapes and configurations shown in the figures. In the depicted embodiment, the lid 60 is constructed of a rigid material, and is attached to the main body 80 through the use of a sonic weld. In other embodiments however, the lid 60 may be secured to the main body 80 in any other manner designed to sealingly attach the lid 60 to the main body 80, including, but not limited to, other mechanical and/or chemical attachment methods.

The sealing element 70 of the depicted embodiment is a ring-shaped seal constructed of a flexible material. However, it should be noted that in other embodiments, the sealing element 70 could have a variety of shapes, including, for example, oblog, hourglass, and elliptical shapes. In the depicted embodiment, sealing element 70 comprises an outer perimeter surface 72, an inner perimeter surface 74, a top surface 76, and a bottom surface 78. The top and bottom surfaces 76, 78 are configured opposite of each other and extend between the outer perimeter surface 72 and the inner perimeter surface 74. Although not visible in FIG. 3, the bottom surface 78 of the sealing member 70 defines a substantially planar surface in order to provide a seal for the air admittance valve 50. In the depicted embodiment, the top surface 76 of the sealing element 70 includes an outer rib 75, a middle rib 77, and an inner rib 79, wherein the ribs 75, 77, and 79 are substantially concentric about the center of the sealing element 70. Although other embodiments of the present invention may not include ribs, in the depicted embodiment, the inner and outer ribs 75, 79 provide support for the sealing element in an area proximate the valve seats. In the depicted embodiment, the sealing member 70 is a unitary element constructed of a silicone material, however in other embodiments, various other configurations and materials are possible.

Referring to FIG. 3, the main body 80 of the air admittance valve 50 includes a top portion 82 and a bottom portion 84. In the depicted embodiment, the bottom portion 84 has a substantially cylindrical shape and includes a threaded section 86 proximate a distal end of the bottom portion 84. In the depicted embodiment, the threaded section 86 of the bottom portion 84 is defined in an outer surface of the bottom portion 84 so that the air admittance valve 50 may be affixed to an internally threaded end of an existing pipe system. In other embodiments, however, the threaded section 86 could be defined by an inner surface of the bottom portion 84, or, in still other embodiments, other methods of attaching the air admittance valve 50 to the pipe system are possible. Although other physical configurations are possible, the cylindrical shape of the bottom portion 84 allows the depicted embodiment to interface with existing pipe systems, which often comprise substantially cylindrical pipes.

The main body 80 of the air admittance valve 50 comprises an approximately cylindrically shaped main body wall 88 (seen more clearly in FIGS. 5 and 6) that defines an inner surface 90 and an outer surface 92. A main body chamber 93 (seen more clearly in FIGS. 5 and 6) is defined by the inner surface of the main body wall 88. Thus, in the depicted embodiment, when the air admittance valve 50 is attached to an existing pipe system, the main body chamber 93 is configured to communicate with the attached pipe system. In the depicted embodiment, the main body 80 of the air admittance valve 50 is made of a rigid thermoplastic material, such as, for example, polyvinyl chloride (PVC) or acrylonitrile butadiene styrene (ABS). It should be noted that other embodiments, the main body 80 may be made of any rigid material. In some embodiments, such as the depicted embodiment, the material of the main body 80 may be chosen to complement the material of the lid 60. However, in other embodiments, the lid 50 and the main body 80 may be constructed of dissimilar materials.

The top end of the main body wall 88 defines a substantially circular surface having a rounded edge, thus defining an inner valve seat 95 of the air admittance valve 50. It should be noted that in the depicted embodiment, although the main body wall 88 has a generally cylindrical shape, it necks inward between the bottom portion 84 and the top portion 82. In other embodiments, however, the main body wall 88 may have other configurations. Additionally, although the inner valve seat 95 of the depicted embodiment has a rounded profile, in other embodiments it could have various profiles configured to provide a seal with the sealing element 70.

In the depicted embodiment, the top portion 82 of the air admittance valve 50 includes an external communication element 96 and an internal communication element 98. The external communication element 96 extends outwardly and upwardly at an angle from the outer surface 92 of the main body wall 88, and defines an external communication chamber 97 between the outer surface 92 and the external communication element 96. The end portion 99 of the external communication element 96 also defines an outer peripheral edge 101 upon which the lid 60 is attached. An end portion 99 of the external communication element 96 defines a substantially circular ring having a rounded edge, which defines an outer valve seat 100. As such, in the depicted embodiment, the inner and outer valves seats 95, 100 are defined by the main body 80. However, in other embodiments the inner and outer valve seats may be defined by various other components, and in some embodiments the inner valve seat may be defined by one component and the outer valve seat may be defined by another component. For example, in one embodiment the inner valve seat may be defined by the main body and the outer valve seat may be defined by the lid. Also, although the outer valve seat 100 of the depicted embodiment has a rounded profile, in other embodiments it could have various profiles configured to provide a seal with the sealing element 70. Additionally, in still other embodiments, the inner valve seat 95 and the outer valve seat 100 could have different profiles.

In the depicted embodiment, the inner and outer valve seats 95, 100 are substantially concentric about the center of the main body wall 88, substantially co-planer with each other, and there is a vent opening 102 located between the valve seats 95, 100. As will be described in more detail below, when the air admittance valve 50 is in an open position, the vent opening 102 between the inner and outer valve seats 95, 100 is configured to allow venting through the vent opening 102, i.e., air can flow between the lid chamber 69 and the external communication chamber 97 via the vent opening 102. In the depicted embodiment, the external communication chamber 97 also includes a plurality of support elements 103 that extend between the outer surface 92 of the main body wall 88 and the external communication element 96. As will be described in more detail below, in various embodiments, the plurality of support elements 103 are configured to prevent the sealing element 70 from becoming lodged in the external communication chamber 97, thus the plurality of support elements 103 are configured to provide support for the sealing element 70 should the sealing element tend to be drawn into the external communication chamber 97 through the vent opening 102 between the valve seats 95, 100. It should be noted that the plurality of support elements 103 are configured so as not to interfere with the ability of the valve 50 to allow communication of air through the vent opening 102 between the inner and outer valve seats 95, 100. Thus, in the depicted embodiment, a plurality of open areas 107 are defined between the plurality of support elements 103.

In the depicted embodiment, the external communication element 96 is comprised of a plurality of projections 104 that extend between the outer surface 92 of the main body wall 88 and the end portion 99. As shown in the figure, the plurality of projections 104 define a plurality of openings 109 therebetween, such that the external communication element 96 allows communication of air between the ambient environment and the external communication chamber 97 through the openings 109. As will be described in more detail below, when the air admittance valve 50 is in an open position, air enters the air admittance valve 50 through the external communication element 96. As a result, the plurality of projections 104 act to protect the inside of the valve 50 from any debris or other materials that may tend to be carried by the air flow. It should be noted, however, in other embodiments of the present invention, other configurations of an external communication element 96 are possible. In such a manner, the openings 109 of the external communication element 96 may have other configurations, including smaller openings, larger openings, or combinations thereof. Furthermore, in various embodiments, the external communication element 96 may have various other configurations, and in some embodiments, there need not be an external communication element 96.

As noted above, the main body 80 also defines an internal communication element 98 that extends inwardly and upwardly from the inner surface 90 of the main body wall 88 proximate the top end 94. In the depicted embodiment, the internal communication element 98 includes a mesh surface 110 (FIG. 3) that extends to a top surface 112. The mesh surface 110 defines a plurality of openings 114, such that the internal communication element 98 allows communication of air through the openings 114. The mesh surface 110 acts to protect the inside of the valve 50 from any debris or other materials that may tend to be carried by the air flow, which may include various debris from the pipe system. It should be noted, however, in other embodiments of the present invention, other configurations of the internal communication element 98 are possible. In such a manner, any openings of the internal communication element 98 may have other configurations, including smaller openings, larger openings, or combinations thereof. Furthermore, in various embodiments, the internal communication element 98 may have a various other configurations, and in some embodiments, there need not be an internal communication element.

FIG. 4 shows the underside of the lid 60. In various embodiments, one or more guiding elements may extend from the lid 60. In the depicted embodiment, a plurality of guiding elements 105 extend from the inner surface 66 of the top portion 62 of the lid 60 into the lid chamber 69. However, in other embodiments a single guiding element may extend from the lid 60, such as, for example, a cylindrical element. In the depicted embodiment, the plurality of guiding elements 105 define a plurality of guiding surfaces 106 that extend downward from the inner surface 66 of the top portion 62. As will be described in more detail below, the plurality of guiding surfaces 106 are configured to guide the sealing member 70 by the inner perimeter surface 74 of the sealing member 70 to guide it as it moves between a closed position (FIG. 5) and an open position (FIG. 6). In the depicted embodiment, the plurality of guiding elements 105 comprises a plurality of substantially triangularly-shaped ribs that are radially disposed about an imaginary center point of the lid 60, and which define a plurality of open areas 108 therebetween such that air may be communicated within the lid chamber 69. In the depicted embodiment, the shape of the guiding elements 105 is configured to complement the shape of the internal communication element 98, however, in other embodiments the plurality of guiding elements 105 may have any configuration that provides a plurality of guiding surfaces 106 for guiding the sealing member 70 by the inner perimeter surface 74 of the sealing member 70 and that allow the lid 60 to be sealingly attached to the main body 80.

In some embodiments, one or more guiding elements may be part of the main body 80 and may extend up from the main body 80, rather than down from the lid 60. An example of an embodiment showing a plurality of guiding elements 105 extending from the main body 80 is depicted in FIG. 7. In other embodiments, one or more guiding elements 105 may be part of the lid 60 and one or more guiding elements 105 may be part of the main body 80. An example of such an embodiment is depicted in FIG. 8. In such a manner, the plurality of guiding elements 105 includes a plurality of guiding surfaces 106 configured to guide the sealing element 70 by the inner perimeter surface 74 of the sealing element 70.

FIG. 5 shows a cross-section view of the air admittance valve 50 in the closed position. As shown in the figure, in the closed position the sealing element 70 rests via force of gravity on the inner and outer valve seats 95, 100 of the main body 80, thus covering the vent opening 102 between the inner and outer valve seats 95, 100. In such a manner, although there may be air communication between the pipe system and the lid chamber 69 (through the main body chamber 93 and the internal communication element 98), the sealing member 70 blocks communication through the vent opening 102 between the inner and outer valves seats 95, 100. Thus, air communication between the pipe system and the ambient environment is blocked. As shown in the figure, in some embodiments the inner and outer ribs 75, 79 of the sealing element 70 may be configured to approximately line up with the inner and outer valve seats 95, 100 of the main body 80 so as to provide support via increased thickness in these areas, thus providing reinforcing support for the sealing element 70 in the areas of contact with the valve seats 95, 100.

Additionally, in some embodiments, there may be situations where the sealing member 70 is subjected to air pressure differentials that may tend to press the sealing member 70 downward into the external communication chamber 97. As also shown in the figure, in the depicted embodiment, the middle rib 77 of the sealing element 70 is configured to be placed in an area between the inner and outer valve seats 95, 100 and proximate the plurality of support elements 103 located in the external communication chamber 97 so as to provide support for the sealing member 70 should the sealing member 70 be pressed downward. As such, the plurality of support elements 103 of the depicted embodiment tend to keep the sealing element 70 from becoming trapped in the external communication chamber, and the middle rib 75 provides reinforcing support for the sealing element 70 in an area of contact with the support elements 103. It should be noted that, in the depicted embodiment, the plurality of support elements 103 do not extend up to the inner and outer valve seats 95, 100 so as not to interfere with the sealing of the valve seats 95, 100. In other embodiments, other support element designs are possible, and in still other embodiments there need not be any support elements in the external communication chamber 97.

FIG. 6 shows a cross section view of the air admittance valve 50 in the open position. The open position is created by a negative pressure condition, which may be initiated when wastewater in the pipe system is released (such as, for example, by flushing a toilet or by draining a wastewater tub). The negative pressure condition causes the sealing element 70 to rise off of the inner and outer valve seats 95, 100, thus opening communication of air through the vent opening 102 between the inner and outer valve seats 95, 100. As shown in the figure, the sealing element 70 is guided into the lid chamber 69 via its inner perimeter surface 74 by the plurality of guiding surfaces 106 defined by the plurality of guiding elements 105. Once in the open position, communication of air through the vent opening 102 between the inner and outer valve seats 95, 100 allows air to be drawn in from the ambient environment and ultimately into the pipe system. In particular, air is drawn from the ambient environment through the openings 106 of the external communication element 96 into the external communication chamber 97, and from the external communication chamber 97 through the vent opening 102 between the inner and outer valve seats 95, 100 and into the lid chamber 69, and from the lid chamber 69 through the openings 114 of the internal communication element 98 and into the main body chamber 93, which is in direct communication with the pipe system. When the negative pressure condition ceases, the sealing element 70 drops down from the lid chamber 69, again guided via its inner perimeter surface 74 by the plurality of guiding surfaces 106 defined by the plurality of guiding elements 105 and onto the inner and outer valve seats 95, 100, thus sealing the vent opening 102 between the valve seats 95, 100, and closing the valve 50.

As a result, and among other reasons, the present invention improves on the prior art by providing an air admittance valve 50 having a sealing element 70 that is guided to and from open and closed positions via an inner perimeter surface 74 of the sealing element 70, and thus without the need for a separate guiding frame structure attached to the sealing member 70. Thus, the present invention provides a simpler air admittance valve design and that provides enhanced performance that is less expensive to manufacture.

Many modifications and other embodiments of the invention set forth herein will come to mind to one skilled in the art to which this invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An air admittance valve configured when subjected to a negative pressure condition to vent a pipe system to an ambient environment, said air admittance valve comprising:
    a main body having top and bottom portions and configured to sealingly attach to the pipe system proximate the bottom portion, the main body also defining a first chamber configured to communicate with the pipe system;
    inner and outer valve seats that define at least one vent opening located between the inner and outer valve seats and configured to communicate with the ambient environment;
    a flexible, free-floating sealing element devoid of a rigid structure and configured to move between a closed position and an open position, the sealing element defining an outer perimeter surface, an inner perimeter surface, and opposite top and bottom surfaces extending between the outer and inner perimeter surfaces; and
    a lid configured to sealingly attach to the main body,
    wherein the lid further comprises one or more guiding elements that define one or more guiding surfaces configured to contact a portion of the inner perimeter surface of the sealing element and allow relative movement with a portion of the inner perimeter surface of the sealing element so as to guide the sealing element to and from the closed position, in which the bottom surface of the sealing element rests against the inner and outer valve seats thus blocking communication through the vent opening, and the open position, in which the sealing element rises off of the inner and outer valve seats such that the first chamber communicates with the ambient environment through the vent opening.

2. The air admittance valve of claim 1, wherein the lid comprises a top portion and a side portion approximately perpendicular to the top portion and extending from an outer perimeter of the top portion of the lid, the top and side portions of the lid each defining inner and outer surfaces such that the inner surfaces of the lid define a second chamber.

3. The air admittance valve of claim 2, wherein the main body comprises an approximately cylindrically-shaped main body wall defining an inner surface and an outer surface, the main body further defining an internal communication element that extends inwardly from the inner surface of the main body wall, and wherein the internal communication element comprises a plurality of openings allowing communication therethrough between the first chamber and the second chamber.

4. The air admittance valve of claim 2, wherein the main body comprises an approximately cylindrically-shaped main body wall defining an inner surface and an outer surface, wherein one end of the main body wall defines the inner valve seat, and wherein the main body further defines an external communication element that extends outwardly and at an angle from the outer surface of the main body wall such that an end of the external communication element defines the outer valve seat, wherein a third chamber is defined between the outer surface of the main body wall and the external communication element, and wherein the external communication element comprises a plurality of openings allowing communication therethrough between the third chamber and the ambient environment.

5. The air admittance valve of claim 4, wherein a plurality of support walls are disposed within the third chamber.

6. The air admittance valve of claim 2, wherein the one or more guiding elements are a plurality of guiding elements that extend from the inner surface of the top portion of the lid.

7. The air admittance valve of claim 6, wherein the plurality of guiding elements comprises a plurality of triangularly-shaped ribs extending substantially downward from the inner surface of the top portion of the lid, the plurality of ribs defining a plurality of guiding edges and wherein the ribs are disposed radially about an imaginary center point.

8. The air admittance valve of claim 1, wherein the top surface of the sealing element includes an inner support rib and an outer support rib, and wherein the inner and outer support ribs are configured to provide support for the sealing element proximate the inner and outer valve seats, respectively.

9. The air admittance valve of claim 8, wherein the sealing element further comprises a middle support rib disposed between the inner and outer support ribs.

10. An air admittance valve configured when subjected to a negative pressure condition to vent a pipe system to an ambient environment, said air admittance valve comprising:
- a main body having top and bottom portions and configured to sealingly attach to the pipe system proximate the bottom portion, the main body also defining a first chamber configured to communicate with the pipe system;
- inner and outer valve seats that define at least one vent opening located between the inner and outer valve seats and configured to communicate with the ambient environment;
- a flexible, free-floating sealing element devoid of a rigid structure and configured to move between a closed position and an open position, the sealing element defining an outer perimeter surface, an inner perimeter surface, and opposite top and bottom surfaces extending between the outer and inner perimeter surfaces; and
- a lid configured to sealingly attach to the main body proximate the top portion of the main body,
- wherein the main body further comprises one or more guiding elements that define one or more guiding surfaces configured to contact a portion of the inner perimeter surface of the sealing element and allow relative movement with a portion of the inner perimeter surface of the sealing element so as to guide the sealing element to and from the closed position, in which the bottom surface of the sealing element rests against the inner and outer valve seats thus blocking communication through the vent opening, and the open position, in which the sealing element rises off of the inner and outer valve seats such that the first chamber communicates with the ambient environment through the vent opening.

11. The air admittance valve of claim 10, wherein the lid comprises a top portion and a side portion approximately perpendicular to the top portion and extending from an outer perimeter of the top portion of the lid, the top and side portions of the lid each defining inner and outer surfaces such that the inner surfaces of the lid define a second chamber.

12. The air admittance valve of claim 11, wherein the main body comprises an approximately cylindrically-shaped main body wall defining an inner surface and an outer surface, wherein one end of the main body wall defines the inner valve seat, and wherein the main body further defines an external communication element that extends outwardly and at an angle from the outer surface of the main body wall such that an end of the external communication element defines the outer valve seat, wherein a third chamber is defined between the outer surface of the main body wall and the external communication element, and wherein the external communication element comprises a plurality of openings allowing communication therethrough between the third chamber and the ambient environment.

13. The air admittance valve of claim 11, wherein a plurality of support walls are disposed within the third chamber.

14. The air admittance valve of claim 11, wherein the main body comprises an approximately cylindrically-shaped main body wall defining an inner surface and an outer surface, the main body further defining an internal communication element that extends inwardly from the inner surface of the main body wall, and wherein the internal communication element comprises a plurality of openings allowing communication therethrough between the first chamber and the second chamber.

15. The air admittance valve of claim 14, wherein the one or more guiding elements are a plurality of guiding elements that extend from the internal communication element of the main body.

16. The air admittance valve of claim 15, wherein the plurality of guiding elements comprises a plurality of triangularly-shaped ribs extending substantially upward from the internal communication element, and wherein the ribs are disposed radially about an imaginary center point.

17. The air admittance valve of claim 10, wherein the top surface of the sealing element includes an inner support rib and an outer support rib, and wherein the inner and outer support ribs are configured to provide support for the sealing element proximate the inner and outer valve seats, respectively.

18. The air admittance valve of claim 17, wherein the sealing element further comprises a middle support rib disposed between the inner and outer support ribs.

19. An air admittance valve configured when subjected to a negative pressure condition to vent a pipe system to an ambient environment, said air admittance valve comprising:
- a main body made of a rigid material and having top and bottom portions and configured to sealingly attach to the pipe system proximate the bottom portion, the main body comprising substantially concentric inner and outer valve seats and at least one vent opening between the inner and outer valve seats and configured to communicate with the ambient environment, the main body also defining a main body chamber configured to communicate with the pipe system, wherein the main body comprises an approximately cylindrically-shaped main body wall defining an inner surface and an outer surface, wherein one end of the main body wall defines the inner valve seat, and wherein the main body further defines an internal communication element and an external communication element, the internal communication element extending inwardly from the inner surface of the main body wall and comprising a plurality of openings allowing communication therethrough between the main body chamber and a lid chamber, the external communication element extending outwardly and at an angle from the outer surface of the main body wall such that an end of the external communication element defines the outer valve seat, and wherein an external communication chamber is defined between the outer surface of the main body wall and the external communication element, the external communication element comprising a plurality of openings allowing communication therethrough between the external communication chamber and the ambient environment;
- a flexible ring-shaped sealing element configured to move between a closed position and an open position, the sealing element defining an outer perimeter surface, an inner perimeter surface, and opposite top and bottom surfaces extending between the outer and inner perimeter surfaces; and
- a lid made of a rigid material and configured to sealingly attach to the main body proximate the top portion of the main body, the lid comprising a top portion, and a side portion approximately perpendicular to the top portion and extending from an outer perimeter of the top portion of the lid, the top and side portions of the lid each defining inner and outer surfaces such that the inner surfaces of the lid define the lid chamber,
- wherein the lid further comprises a plurality of triangularly-shaped ribs extending substantially downward from the inner surface of the top portion of the lid and disposed radially about an imaginary center point such that the plurality of ribs define a plurality of guiding edges configured to engage the inner perimeter surface of the sealing element so as to guide the sealing element to and from the closed position, in which the bottom surface of the sealing element rests against the inner and outer valve seats of the main body thus blocking communication through the vent opening, and the open position, in which the sealing element rises off of the inner and outer valve seats such that the main body chamber communicates with the ambient environment through the vent opening, the lid chamber, and the external communication chamber.

* * * * *